United States Patent Office 3,236,600
Patented Feb. 22, 1966

3,236,600
SOIL TEST METHOD
Wallace Shrimpton, 2 Clark Drive, San Mateo, Calif., and Frank Z. Patassy, 320 Judah St., San Francisco, Calif.
Filed May 2, 1963, Ser. No. 277,652
17 Claims. (Cl. 23—230)

This invention relates generally to methods for testing soils to determine their potential supply of nutrients for various crops, and more particularly to a soil test method for determining the availability of certain mineral nutrients in soils.

As is well known, certain elements are essential for the healthy growth of plants. Some of these elements (e.g., nitrogen, phosphorus, potassium) are needed in relatively large quantities, whereas others (e.g., iron, manganese, boron) are required in very small amounts. The former are sometimes referred to as "major" elements or "macronutrients" and the latter as "trace" elements or "micronutrients." Despite the different amounts required, both types of elements are essential and important to plant health. Thus, according to the still accepted law of minimums advanced by Liebig (1843), the health and rate of growth of plants is largely determined by the particular element which is available in minimum amount. More specifically, a soil which is deficient in one of the essential elements, whether it be a "major" or a "trace" element, will not properly nourish the crop to achieve desired plant health and growth, in the absence of corrective measures.

It is also well known that most if not all soils are deficient in one or more mineral nutrients. However, the nature and extent of the mineral deficiency of a particular soil is not always easily determined. One general technique for determining mineral deficiencies in the soil is the visual diagnosis or chemical analysis of plants actually grown in the soil. This technique suffers from the fact that knowledge is frequently gained only after considerable experience, frequently obtained by growing crops for several years on the land in question. The more refined procedures employed in field or pot culture trials (wherein certain mineral nutrients are withheld or added to test plots or to pot cultures) are subject to the same objection, namely, that months or even years are required to adequately determine a particular soil deficiency.

Faced with the obvious shortcomings of field and pot culture experiments, it was natural for chemists to attempt chemical examinations of soils to determine their potential supplies of nutrients. However, it soon became evident that the problem was not a simple one. For example, tests on various soils would show the presence of considerable amounts of a given nutrient element, and yet crops grown on such soils would show distinct signs of dificiency of this element. This immediately raised questions as to the extent to which particular elements in soils were available for use by plants or crops. Various methods were subsequently developed for determining the "availability" of individual nutrient elements, and several proved to be highly satisfactory for determining the "availability" of specific "major" nutrients, particularly nitrogen, phosphorus and potassium. More recently, the development of biological methods based on the use of microorganisms has extended the ability to analyze for additional macronutrients, such as calcium and magnesium, and in addition, has permitted useful determinations of certain micronutrients (e.g., copper, zinc, and molybdenum). Specifically, the *Aspergillus niger* method of mineral bioassay has proved highly effective for this purpose.

Despite the considerable success that has been achieved in attempts to chemically analyze soils, presently available techniques are still subject to a number of distinct shortcomings. A particular defect is that most effective testing methods presently employed are excessively slow, requiring a minimum of two to three months to reach a final determination. In addition, certain mineral deficiencies (e.g., sulfur, iron and manganese deficiencies) are not effectively determined by any of the known methods.

In general, it is an object of the present invention to provide a solution to the above and to additional problems, and to provide an improved soil test method which not only effectively determines the availability of certain mineral nutrients in soils, but which also effects a substantial reduction in the time required for carrying out the test.

Another object of the invention is to provide a soil test method of the above character which can be easily carried out with conventional laboratory equipment, using conventional techniques, and which provides a high degree of reliability and reproducibility of result.

Another object of the invention is to provide a soil test method of such character which can be effectively carried out by untrained laboratory technicians without the use of extensive laboratory facilities and equipment.

Another object of the invention is to provide an effective soil test method which can be carried out in a relatively short period of time (e.g., two weeks or less).

Another object of the invention is to provide a soil test method of the character above-described which is effective in determining the availability of certain mineral micronutrients not readily determined by prior test methods, specifically iron, manganese and sulfur.

Other objects and advantages of the present invention will appear from the following description and from the drawings in which.

In general, the soil test method of the present invention is based on the fact that chlorophyll is synthesized in virtually all of the higher plant organisms upon exposure to light. It is also based on our observation that certain higher plant organisms used in carrying out our test method (e.g., algae or Lemma) require specifically most of the known nutrients if effective growth, including the development of chlorophyll, is to be achieved. These known mineral elements include the macronutrients, nitrogen, phosphorous, calcium, magnesium and potassium, and the micronutrients, sulfur, iron, manganese, copper, molybdenum, and zinc. When any one of these mineral elements is denied to a culture of algae, Lemna, or similar plant organism, the growth or health of such organism, and consequently the production of chlorophyll by such organism, is greatly reduced.

In accordance with the present invention, the availability of certain mineral nutrients in soils is determined by mixing the soil to be tested with a chlorophyll producing organism of the type described, and a nutrient solution containing all the nutrients necessary to the growth of said organism except the mineral nutrient to be determined. The test sample thus prepared is then exposed to light under controlled conditions for a period of time sufficient to induce substantial growth and production of chlorophyll by the organism. Thereafter, the chlorophyll is extracted from the organism by known techniques, and the light absorption or decrease in light transmission through the extract liquid due to the presence of the extracted chlorophyll is determined by colorimetric procedures. As will be understood, the growth of the plant and production of chlorohpyll under the conditions indicated will depend in large measure upon the amount of test mineral "available" in the soil undergoing test. An effective measure of the growth response can therefore be determined by a comparison of the light absorption in the test extract with an extract control series prepared for the mineral element under test. In a preferred practice of the invention, one or more control samples are processed simultaneously with the soil test sample, to verify and calibrate the control series, although this is not absolutely necessary.

While it is possible to employ the concepts of the present invention in the determination of available macronutrients or "major" elements in soils, the invention is particularly directed to improvements whereby the availability of "trace" elements, or micronutrients, can be determined, and specifically the availability of trace amounts of iron, manganese, and sulfur. As previously noted, no satisfactory test method has heretofore been devised for testing soils in connection with the latter micronutrients.

Figure 1:
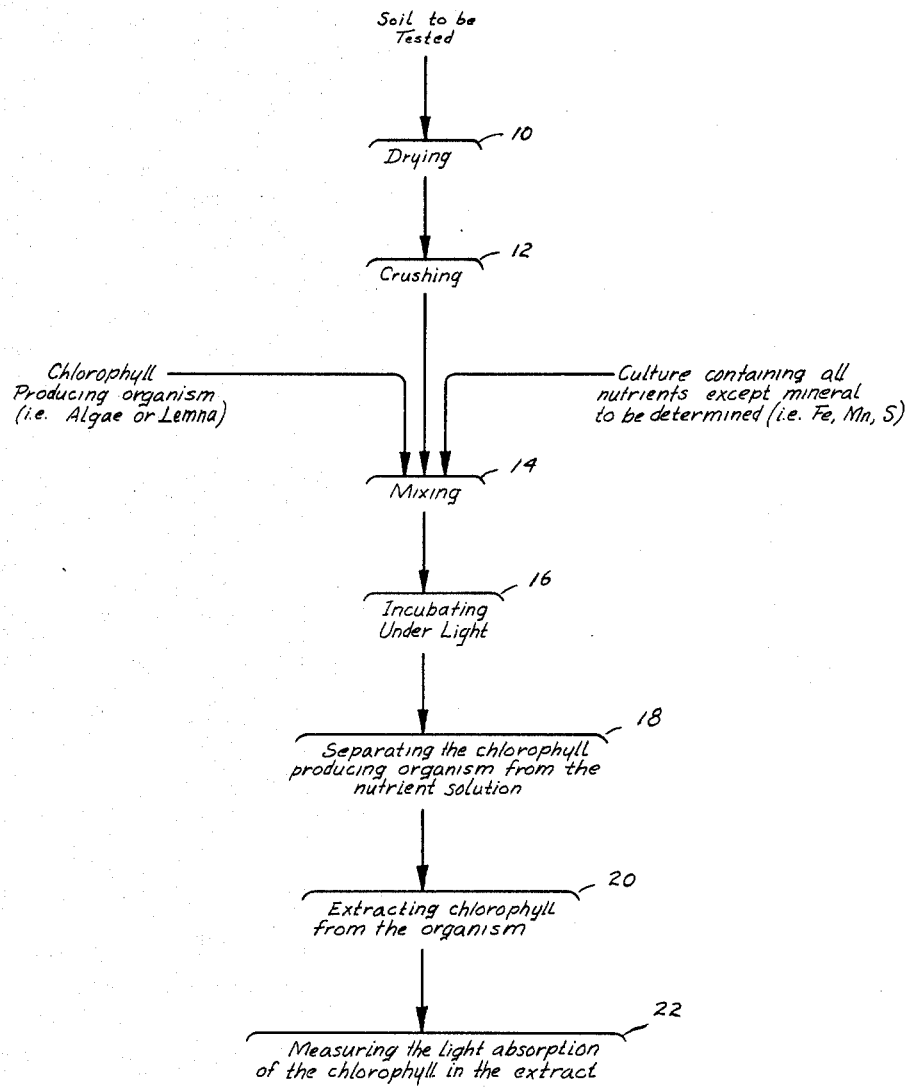
FIGURE 1 is a flow sheet illustrating the general steps in carrying out the method of the invention.

With the foregoing in mind, our new method can be carried out substantially as illustrated in FIGURE 1. Steps 10 and 12 represent the preliminary preparation of test soil wherein the soil is first dried to room temperature and humidity and then crushed to produce a finely divided soil sample. Apparatus used in carrying out these and subsequent steps in the processing must be absolutely clean (i.e., acid washed and rinsed) to avoid the introduction of contaminants. Test samples are next prepared from the soil by weighing known amount of the soil into suitable receptacles, for example plastic dishes or similar containers, with the samples preferably being prepared in duplicate or triplicate.

A nutrient solution or culture containing all of the above specified mineral elements (exclusive of the mineral to be determined) is then mixed with the test soils, in step 14, along with the chlorophyll producing organism. As will appear, individual or mixed strains of blue-green algae (Cyanophyta) or green algae (Chlorophyta, Zygophyta) are preferred for use in our test method. However, the invention is not limited to any particular organism, and various small seed plants, for example certain species of the family Lemnaceae have also proved highly satisfactory for use in our method. In general, it is also desirable to prepare one or more control samples at the time of preparing the soil test samples. Specifically, one control sample may comprise the nutrient solution and chlorophyll producing organism, without soil or added mineral elements, while additional control samples can be prepared with known additions of the mineral element undergoing tests.

Figure 2:
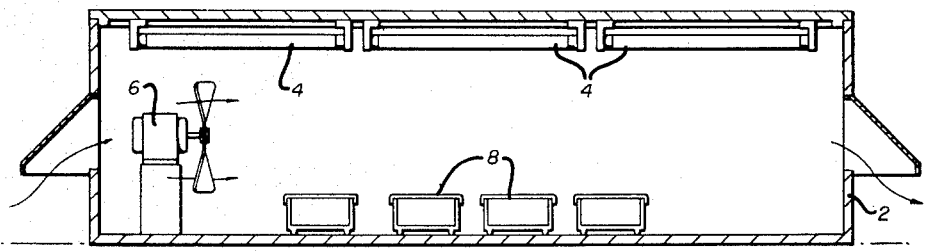
FIGURE 2 is a schematic representation of apparatus for carrying out the method of the invention.

In step 16, the various test samples and control samples are incubated under light for periods of time sufficient to induce a substantial growth of the chlorophyll producing organism. A suitable apparatus for this purpose is shown in FIGURE 2 and comprises no more than a ventilated container or box 2 provided with a series of light sources 4, and a fan 6 for circulating air about the test samples 8. We have found that a period of exposure ranging from about 10 to 18 days will satisfactorily develop the chlorophyll in the plant organisms under test, with optimum results being obtained in approximately 14 days. Room temperatures (i.e., 20 to 25° C.) are preferably maintained in the vicinity of the test samples by a controlled circulation of air with the fan 6. While the light sources 4 are preferably of the artificial fluorescent type used in plant growth studies (i.e., with a balanced blend of red and blue radiations within the range of wave lengths from about 400 to 700 millimicrons), satisfactory results can also be obtained with ordinary fluorescent or incandescent lamps, or with sunlight.

Following the incubation period, the chlorophyll producing organism is separated from the nutrient solution in step 18, for example by filtration. The chlorophyll in the the organism is now extracted in step 20 by means of anhydrous ethyl alcohol or other suitable low boiling organic solvent (i.e., boiling below about 100° C.). Suitable solvents for this purpose, in addition to ethanol, include ether, acetone, chloroform, carbon disulfide, and benzene. In step 22, the light absorption or decrease in light transmittance due to the extracted chlorophyll is determined by placing the extract liquid in a colorimeter or other suitable apparatus for this purpose. The growth response due to the test mineral extracted from the soil can be determined by comparison of the degree of light absorption with an extract control series prepared for the element under test. As previously indicated, a control sample containing no test mineral, and one or more control samples containing known amounts of the test mineral, are simultaneously processed with the samples of the test soil. These control samples provide an effective standard for comparison with the test samples as well as an effective means for calibrating the test samples against the control series.

In carrying out the present invention, it is essential that effective procedures be adopted to avoid contamination from exterior sources. For example, most industrial chemicals, even the purest reagent grades, contain metals as impurities. In like fashion, ordinary water supplies contain substantial amounts of mineral impurities. Consequently the use of re-distilled water as well as proper purification methods for all dishes, bottles, flasks, pipettes, or other materials or equipment coming in contact with the culture solution are essential to avoid the introduction of contaminants. Washing and cleaning with concentrated acid, for example anhydrous HCl, has proved a satisfactory measure, followed by rinsing several times with distilled water. It will be understood that these precautions are necessary where the only limiting factor for plant growth is the absence of a single mineral from the nutrient solution.

In preparing the nutrient solution, various salts containing the "major" nutrient elements, nitrogen, phosphorous, calcium, magnesium, and potassium, are dissolved in distilled water and the solution heated in a steamer or autoclave to reduce microbiological contamination, following which the solution is filtered. A small amount of a sequestering agent, such disodium ethylenediaminetetraacetate is preferably added to prevent undesirable reactions with certain of the metal ions (e.g., Cu, Fe, etc.). Salts and oxides containing the mineral micronutrients are now added to the solution with the exception that the salt containing the mineral element under test is intentionally omitted. For convenience, various chlorides may be employed to insure a proper proportion of chlorine trace elements as well as iron, manganese, boron, copper, zinc, and molybdenum.

As previously indicated, we have found that individual or mixed strains of algae are highly satisfactory plant organisms for our use in our testing method. For example, specific starins of the Cyanophyta, or blue-green algae (i.e., the Nostocmuscorum strain) have proved particularly satisfactory, likewise individual or mixed strains of the Chlorophyta, or green algae. Preferably, a mixed culture of different soil algae (i.e., naturally produced) are employed. These mixed strains are characterized by an improved ability to live in somewhat unfavorable environments, and therefore provide a greater reliability to our test method. In general, fresh water strains are also preferred for use in our method, although various marine types including even the Phaeophyta or brown algae, and the Rhodophyta or red algae, conceivably could be employed under appropriate conditions.

While various strains and mixed strains of algae have proved highly successful in carrying out our method, the method is in no way limited to algae. For example, various small aquatic herbs or small seed plants have also proved to be highly satisfactory. Thus the family Lemnaceae including the genera Lemna, Wolffia, and Spirodela, are capable of use. Species of the genus Lemna, specifically the Lemna Minor, provide the advantage of a growth habit in which an individual frond with a single root subdivides to produce a plurality of such fronds. This growth habit makes possible a quantitative determination of growth through the simple expedient of counting fronds (following the incubation or growth period) thereby providing an alternate procedure to the chlorophyll extraction method described heretofore. This counting technique is particularly adapted to use in the backward countries, where simple colorimeters or other light transmittance apparatus for testing or comparing extracted chlorophyll may not be readily available. However, due to the ready availability of colorimetric apparatus and procedures in this conutry, and due to the excessive amount of time required by the frond counting technique, the use of the chlorophyll extraction technique is specifically indicated for use in areas of relatively advanced technology.

Figure 3:
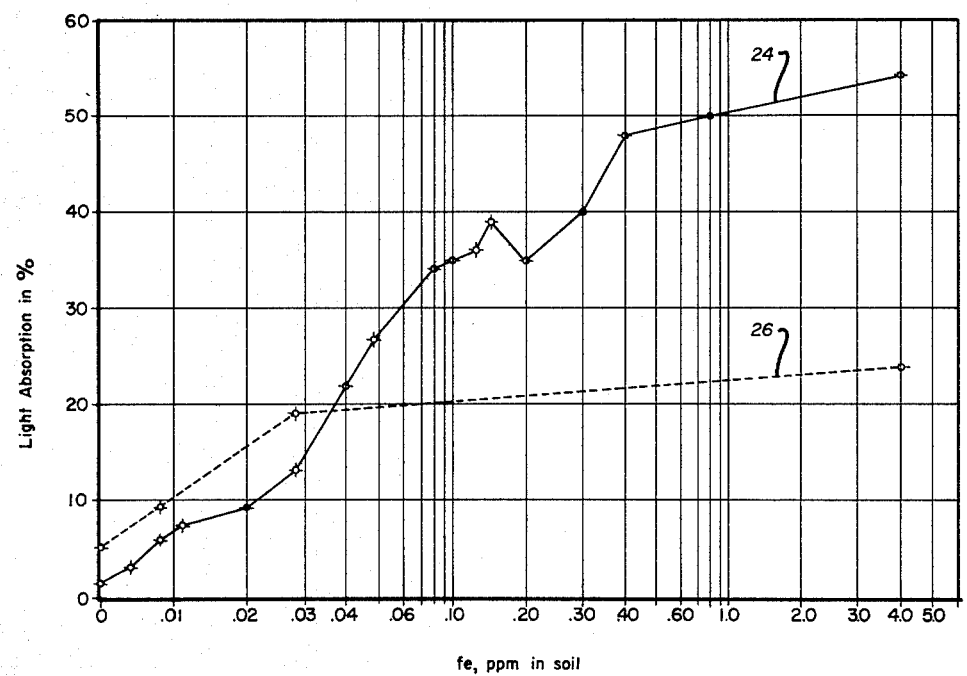
FIGURE 3 is a graphic representation of a standard control series for mineral nutrient to be determined in accordance with the method of the invention.

The described soil test method, carried out in accordance with the invention, has many advantages. Specifically, it permits the testing of any specific soil test sample for availability of the micronutrients such as iron, manganese or sulfur, in approximately one-tenth to one-fourth the time heretofore required. Moreover, the test method can be easily carried out by the simple expedient of mixing the soil with a previously prepared culture medium and a small quantity of algae or like plant matter, followed by a short incubation or growth cycle in the presence of light. Thereafter the chlorophyll can be extracted from the multiplied plant material, and the resulting extract subjected to colorimetric comparison to determine the "availability" of the test nutrient by graphical comparison. This latter step is exemplified in FIGURE 3, which shows a graphic representation of a standard control series for trace amounts of iron. More specifically, by plotting light absorption (expressed as percent) against the parts per million of the test mineral in the soil (determined mathematically from the control series), a curve can be prepared for the particular plant organism used in the test. Thus, curve 24 represents a graphical representation for the growth of algae in nutrient cultures containing different known concentrations of iron, mathematically converted to parts per million on the soil. Curve 26 similarly plots the growth response of Lemna with different known concentrations of iron in the nutrient solution, converted to parts per million on the soil. As will be understood, once the test sample has been properly prepared, and the chlorophyll extracted from the plant organism used in the test, the absorption of light by the chlorophyll in the test sample can be compared against the plot of extracts based on known amounts of iron to achieve an indication of the amount of iron supplied by the soil undergoing test. As noted heretofore, the accuracy of comparison can be enhanced by the use of control samples corresponding to points on the plot, to verify and calibrate the control curve.

Of particular significance, is the fact that the soil test method of the present invention permits soils to be tested for trace amounts of iron, manganese and sulfur. These elements cannot be detected by the *Aspergillus niger* method nor can they be reliably detected by any other presently available test method, including currently employed microbiological techniques. A further specific advantage is the fact that the test method of the invention can be carried out by relatively unskilled laboratory technicians employing simple laboratory apparatus and techniques. As a result the soil test method of the present invention is adapted to widespread use in the field, to obtain relatively rapid reliable soil analyses.

The many advantages of the invention are exemplified in the following specific examples of its practice.

*Example 1*

Preparations were made for the determination of plant available iron by preparing a nutrient solution according to the following general procedure:

Add to one liter of distilled water:

| | Amount, in grams |
|---|---|
| $KNO_3$ | 0.40 |
| $K_2HPO_4$ | 0.44 |
| $MgSO_4.7$, aq. | 0.35 |
| $CaCO_3$ | 0.25 |
| $CaHPO_4.2$, aq. | 0.75 |

Heat the resulting solution in a steamer for 50 minutes, cool to room temperature, and filter. Add 0.5 ml. of a saturated solution of disodium ethylenediaminetetraacetate, and to the resulting solution add the following micronutrients:

| | Amount, in Milligrams | Mineral Concentration |
|---|---|---|
| $ZnCl_2$ | 0.083 | .04 p.p.m. Zn |
| $CuCl_2.2$ aq | 0.027 | .01 p.p.m. Cu |
| $MnCl_2.4$ aq | 0.136 | .075 p.p.m. Mn |
| $MoO_3$ | 0.068 | .02 p.p.m. Mo |
| $H_3BO_3$ | 0.228 | .04 p.p.m. B |
| $Ga(NO_3)_2.8$ aq | 0.10 | .02 p.p.m. Ga |

Test samples were prepared by air drying a quantity of the test soil on a polyethylene sheet, at room temperature, following which the soil was crushed in a previously acid washed porcelain mortar. 0.25 gram aliquots of the dried crushed soil were weighed into clear plastic containers (acid washed and rinsed with distilled water), each approximately 4 cm. tall and 8.5 cm. in diameter. 25 ml. of the nutrient solution prepared as above was then added to the soil in each container, following which the nutrient solution in each container was inoculated with a fresh algal culture prepared in accordance with the following general procedure.

A small quantity of glass wool is placed in a funnel, and a solution containing the algal cells is filtered through the glass wool until it is covered with green material. Several hundred ml. of mineral free (re-distilled) water is poured into the funnel to wash all possible solution from the glass wool and to lessen the danger of contamination. The wash water is poured slowly so as not to remove too much of the algae. The glass wool covered with the green algae is removed from the funnel and put into a 100 ml. polyethylene bottle, which is filled three-quarters full with mineral free water. The bottle is centrifuged to obtain a homogeneous solution.

The various samples (both test samples and control samples) were inoculated with three drops each (0.18 ml.) of the above inoculum, using a polyethylene dropping pipette, and the samples incubated for 14 days in a light cabinet (FIGURE 2) maintained at a temperature within the range from 20 to 25° C. The samples were then removed from the incubation cabinet and the nutrient solution separated from the algae by filtration through No. 1 Whatman filter paper. Each filter paper with the algal cells thereon was then returned to its own test container, and 50 ml. of anhydrous ethyl alcohol added to extract the chlorophyll from the algal cells on the filter and remaining in the dish. Approximately 1 to 2 hours was provided to complete the alcohol extraction of the chlorophyll. Approximately half of the extract liquid (about 20 ml.) was then placed in a test tube, and the entrained soil and plant material allowed to settle. The upper portion of the extract liquid (approximately 10 ml.) was decanted into a second test tube or colorimeter test sample holder, which was placed in a Cenco colorimeter. The light transmittance of each sample was read, using a red filter, and compared against a standard comprising pure anhydrous ethyl alcohol to thereby determine the percent of light absorption due to the extracted chlorophyll.

The value of light absorption so determined was then employed to enter a control chart (FIGURE 3), from which a reading in parts per million of iron available in the test sample was obtained. Simultaneously the light absorption of control samples prepared and tested concurrently with the soil test samples was determined, and the determinations used to calibrate the control curve for purposes of a final determination of the "available" iron in the test soil samples.

In this particular test, the samples were prepared in duplicate to insure a desired accuracy of the test results.

The described procedure has been successfully employed in preparing analyses of a wide variety of soils and has proved highly effective in determining the availability of trace amounts of iron as a mineral nutrient for plant growth. Soils analyzed to date have indicated an iron availability ranging from about 2 parts per million up to about 50 parts per million, based on the weight of the soil. In general, when a soil analysis indicates an iron availability below about 6 parts per million, it can be assumed that the soil will provide an insufficient amount of iron as a micronutrient for effective plant growth.

*Example 2*

Determinations of the available manganese in test soils were made in accordance with the procedure generally outlined in Example 1, using the same nutrient solution, except that the added micronutrients excluded manganese while including iron compositions. The change is indicated in the following designation of the added micronutrients:

|  | Amount in Milligrams | Mineral Concentration |
| --- | --- | --- |
| $FeCl_3.6$ aq | 1.9 | .40 p.p.m. Fe. |
| $ZnCl_2$ | .083 | .04 p.p.m. Zn. |
| $CuCl_2.2$ aq | .027 | .01 p.p.m. Cu. |
| $MoO_3$ | .068 | .02 p.p.m. Mo. |
| $H_3BO_3$ | .228 | .04 p.p.m. B. |
| $Ga(NO_3)_2.8$ aq | .1 | .02 p.p.m. Ga. |

The soil test samples were prepared as before, using 0.01 gram of air dried soil per 25 ml. of culture. The inoculation and incubation was as described in Example 1, in the test for iron. The procedures for inoculation, incubation, extraction of chlorophyll and determination of light absorption of extract liquid were identical to those described in Example 1. Determinations of available manganese were then obtained by graphical means, based on a control series for trace amounts of manganese.

The described procedure for determining available manganese has likewise been successfully employed in preparing analyses on a wide variety of soils. These soil analyses indicate a manganese availability in soils ranging from 20 p.p.m. or below to as high or more than 600 or 700 p.p.m. based on the soil. In general, a manganese availability below about 30 p.p.m. on the soil indicates that the soil is deficient in manganese.

*Example 3*

Determinations of availability of sulfur in test soils were carried out by a procedure substantially identical to that described in Examples 1 and 2 for iron and manganese except, again, the nutrient solution was modified to exclude sulfur while including the iron and manganese micronutrients. This was accomplished by replacing the 0.35 gram of $MgSO_4.7$ aq. in the nutrient formulation with 0.2 gram of $MgCl_2.6$ aq. The complete list of micronutrients in the nutrient solution employed is set forth below:

|  | Amount in Milligrams | Mineral Concentration |
| --- | --- | --- |
| $FeCl_3.6$ aq | 1.9 | .40 p.p.m. Fe. |
| $MnCl_2.4$ aq | .136 | .075 p.p.m. Mn. |
| $ZnCl_2$ | .083 | .04 p.p.m. Zn. |
| $CuCl_2.2$ aq | .027 | .01 p.p.m. Cu. |
| $MoO_3$ | .068 | .02 p.p.m. Mo. |
| $H_3BO_3$ | .228 | .04 p.p.m. B. |
| $Ga(NO_3)_2.8$ aq | .1 | .02 p.p.m. Ga. |

Again, the procedures for inoculation with algae, incubation, extraction of chlorophyll and determination of the light absorption by the extract liquids were identical to those described in the preceding examples. The final determinations of the sulfur availability were likewise made by means of a graphical solution, related to a control series prepared on sulfur.

Soils analyzed by this procedure indicated the presence of sulfur ranging in amounts from zero to several hundred parts per million. Soils containing less than about 10 parts per million were determined to be deficient in sulfur.

*Example 4*

The procedures of each of Examples 1 to 3 were repeated, except that the test samples were inoculated with a single frond of Lemna Minor. During the incubation period the inoculum was observed to grow to a three-frond plant, following which the plant split into new plant organisms, each comprising a single frond. Throughout the incubation period this process of growth to new plants, followed by splitting to produce individual fronds, was repeated until the incubation period was terminated.

In one series of tests, chlorophyll was extracted from the plant materials according to the procedure described in Example 1, and the availability of the test micronutrient (i.e., Fe, Mn, or S) was determined by the light absorption technique in a colorimeter. In another series of tests, the test samples were removed from the incubator, and the samples visually inspected to determine the increase in the frond count of the Lemna Minor. The degree of multiplication, or increase, was then compared with control samples to determine mathematically the availability of the test micronutrient in parts per million on the soil.

It may be explained that the final determination of micronutrient "availability" in each of the test series described in Example 4 (i.e., in p.p.m. on the soil) was made by a graphical solution, based on an initial control series for the test nutrient. We have found that this technique whether related to extracted chlorophyll, frond count, or other indication of plant growth, provides a fast effective means to obtain an ultimate soil analysis. However, it will be understood that mathematical solutions might also be employed based on the same information, or that other known techniques might be employed. These and other variations in the practice of our test method are considered to be clearly within the scope of the invention.

It may also be explained that our method measures the available iron, manganese or like soil micronutrient whether it be present in simple mineral form or in combined form in the organic constituents of the soil. The term "mineral" is consequently used herein in a broad sense and is not intended to be limiting, apart from the scope of the appended claims.

We claim:

1. In a process for determining the availability of mineral nutrients in soil, the steps of mixing together a test soil, a chlorophyll producing organism and a nutrient solution containing all mineral nutrients necessary to the growth of said organism except the mineral nutrient to be determined, exposing the same to a source of light for a period of time sufficient to induce a substantial growth of said organism, extracting the chlorophyll from said organism with an appropriate organic solvent, measuring the decrease in light transmittance through said extract liquid due to the presence of said extracted chlorophyll, and comparing said decrease in light transmittance with the decrease in light transmittance of a control series prepared on the mineral nutrient undergoing determination.

2. A process as in claim 1 wherein said chlorophyll producing organism is selected from the group algae.

3. A process as in claim 1 wherein said chlorophyll producing organism is selected from the family Lemnaceae.

4. A process as in claim 1 wherein the nutrient solution is purified by heating, prior to mixing.

5. A process as in claim 1 wherein said light source is artificial.

6. In a process for determining the availability of mineral micronutrients in soil, the steps of bringing together known amounts of a test soil, a chlorophyll producing organism and a nutrient solution containing all nutrients including mineral micronutrients necessary to growth of said organism except the mineral micronutrients to be determined, exposing the same to a source of light for a period of time sufficient to induce a substantial growth of said organism, extracting the chlorophyll from said organism with a relatively low boiling organic solvent, measuring the light absorption caused by said extracted chlorophyll, and matching the light absorption of said extracted chlorophyll with the light absorption of a control series simultaneously prepared on the mineral micronutrient to be determined.

7. A process as in claim 7 wherein the period of exposure to said light source is within the range from about ten to eighteen days.

8. A process as in claim 7 wherein said light source produces an artificial fluorescent light.

9. A process as in claim 7 wherein said organism is maintained at a temperature within the range of about 20 to 25° C. throughout the period of exposure to said light source.

10. A process as in claim 1 wherein said organic solvent has a boiling point below about 100° C.

11. A process for determining the availability of mineral micronutrients in soils, including iron, manganese and, sulfur, comprising, drying and crushing a test soil, preparing a test sample by placing said test soil in contact with a chlorophyll producing organism and a nutrient solution for said organism, said nutrient solution containing all nutrients necessary to the growth of said organism, except the mineral micronutrient to be determined, exposing the test sample to light for a period of ten to eighteen days to cause substantial growth of said organism, extracting the chlorophyll from said organism with a relatively low boiling organic solvent selected from the group consisting of methanol, ethanol, ether, acetone, chloroform, carbon disulfide, and benzene, measuring the light transmittance through said extract liquid to determine the light absorption caused by said extracted chlorophyll, and matching the light absorption of said test sample with the light absorption of a sample in a control series prepared on the mineral micronutrient to be determined.

12. A process as in claim 11 wherein said processing is carried on simultaneously in conjunction with a control sample containing no soil.

13. A process as in claim 11 wherein said processing is carried on simultaneously in conjunction with a control sample containing a known amount of the mineral micronutrient to be determined.

14. A process as in claim 11 wherein said processing is carried out simultaneously in conjunction with a series of control samples, one of said control samples containing no soil, and another of said control samples containing a known amount of the mineral micronutrient to be determined.

15. A process as in claim 11 wherein said nutrient solution contains no iron.

16. A process as in claim 11 wherein said nutrient solution contains no manganese.

17. A process as in claim 11 wherein said nutrient solution contains no sulfur.

References Cited by the Examiner

Comar: Industrial and Engineering Chemistry, vol. 14, No. 11, pp. 877 to 879, November 1942.

Nicholas: Science of Food and Agriculture, vol. 1, No. 11, pp. 339 to 344, November 1950.

Scott: Journal of Cellular and Comparative Physiology, vol. 21, No. 3, pp. 327 to 338, June 1943.

A. LOUIS MONACELL, *Primary Examiner.*